E. A. NELSON.
CONTROL MECHANISM FOR MOTOR VEHICLES.
APPLICATION FILED SEPT. 7, 1909.
1,050,984.
Patented Jan. 21, 1913.
2 SHEETS—SHEET 1.
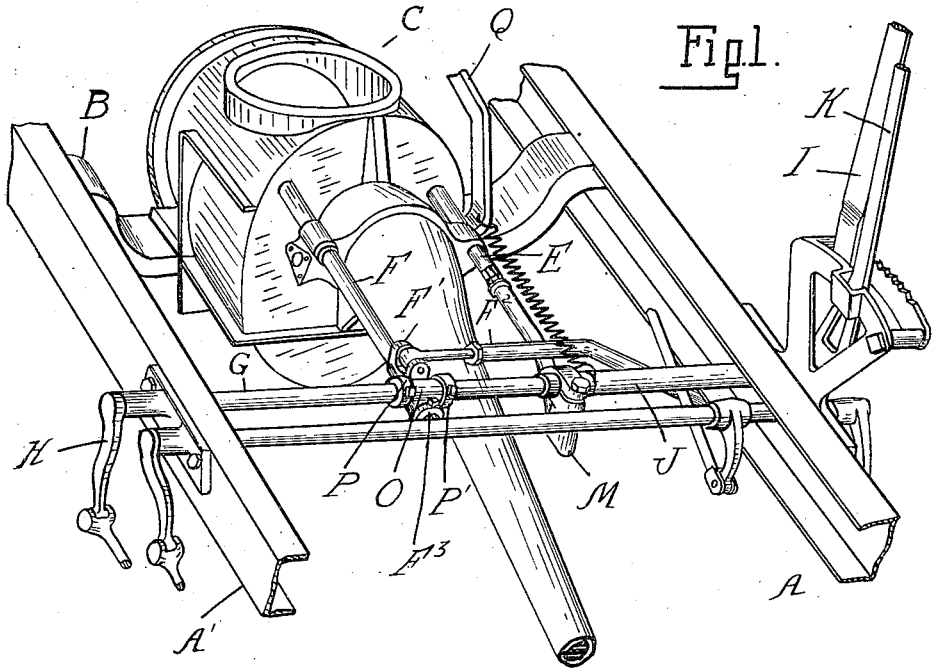
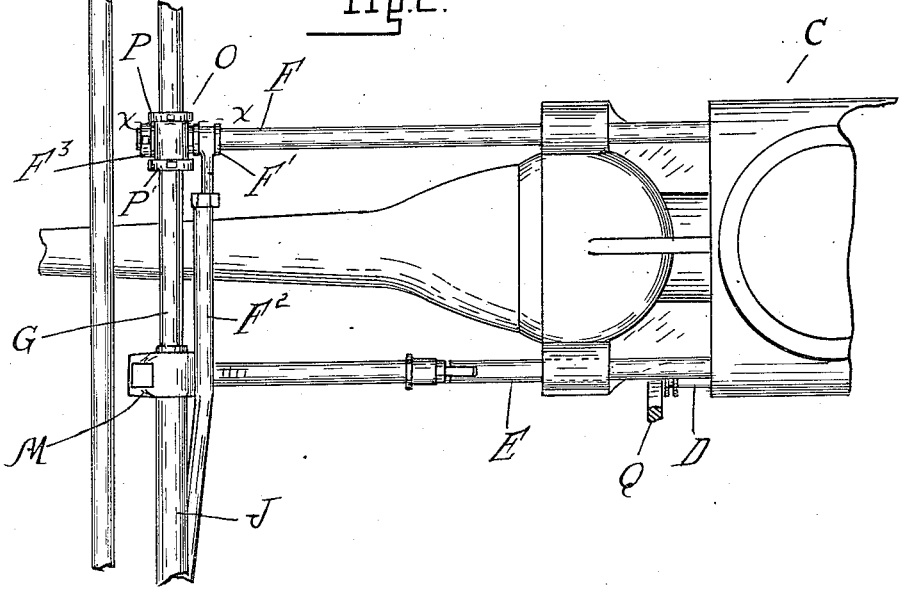
Witnesses
Inventor
Emil A. Nelson
By Whittemore Hulbert & Whittemore
Attys

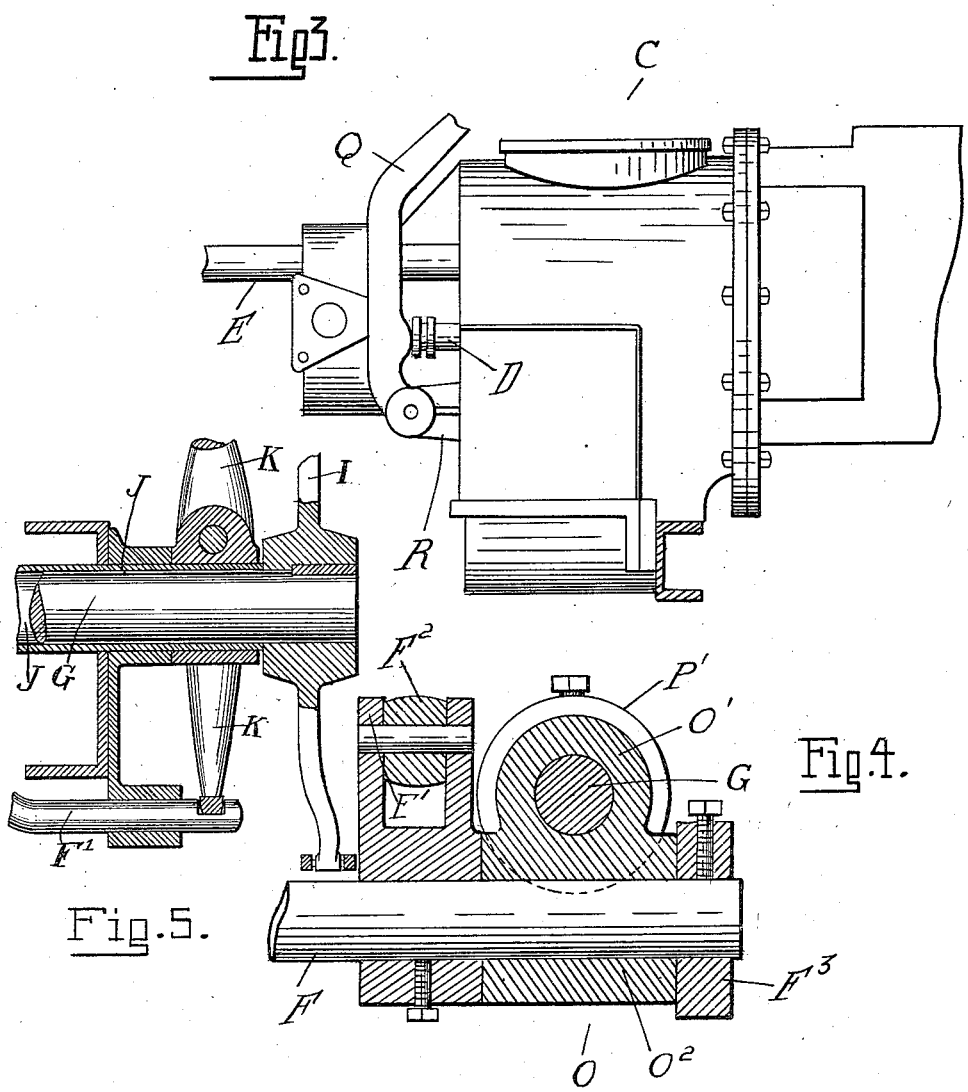

UNITED STATES PATENT OFFICE.

EMIL A. NELSON, OF DETROIT, MICHIGAN, ASSIGNOR TO HUPP MOTOR CAR COMPANY, OF DETROIT, MICHIGAN, A CORPORATION OF MICHIGAN.

CONTROL MECHANISM FOR MOTOR-VEHICLES.

1,050,984.     Specification of Letters Patent.     Patented Jan. 21, 1913.

Application filed September 7, 1909. Serial No. 516,378.

*To all whom it may concern:*

Be it known that I, EMIL A. NELSON, a citizen of the United States of America, residing at Detroit, in the county of Wayne and State of Michigan, have invented certain new and useful Improvements in Control Mechanism for Motor - Vehicles, of which the following is a specification, reference being had therein to the accompanying drawings.

The invention relates to control mechanism, and more particularly to the means for controlling the power transmission in a motor vehicle.

It is the object of the invention to obtain a simple, compact and efficient control, and to this end the invention consists in the construction as hereinafter set forth.

In the drawings—Figure 1 is a perspective view of a portion of the frame of an automobile to which my improvement is applied; Fig. 2 is a plan view thereof; Fig. 3 is a side elevation; Fig. 4 is a section on line X—X, Fig. 2; and Fig. 5 is a detailed sectional view in the plane of the operating levers.

A is the frame of the motor vehicle, having the parallel side sills A' and the cross frame B, upon which is supported the casing C for the transmission gearing. The transmission gearing housed within this case may be of any suitable construction for securing a plurality of different speeds, and also preferably including a main clutch for connection with the motor. The operating and controlling devices for the mechanism include a push rod D for controlling the main clutch, a sliding shaft or bar E for controlling the shiftable gears, and a rock shaft F for controlling other shiftable gears. These three members all project through bearings in the rear wall of the casing C and are controlled by mechanism of the following construction.

G is a rock shaft extending transversely of the frame and journaled in bearings on the opposite side sills thereof. This shaft is preferably employed for operating the emergency brake for the vehicle, and to this end is provided with a rock arm H and a controlling lever I arranged at opposite ends thereof. In addition to its function of controlling the brake, the shaft G forms a supporting bearing for a tubular rock shaft J sleeved thereon, having an actuating lever K and a rock arm M, the latter being connected with the end of the sliding rod E. A still further function for the shaft is that it forms an anchor or support for a bearing O, in which the outer end of the rod F is journaled. This bearing O has an eye O' sleeved upon the shaft G and positioned thereon by collars P P' on opposite sides thereof secured by set screws. Below the eye portion the bearing O has a portion $O^2$ bored at right angles to the shaft G and forming the journal bearing for the rock shaft F. This rock shaft is actuated by a rock arm F' arranged adjacent to the journal bearing $O^2$ and connected by a link $F^2$ to the control lever K, which is capable of moving in a direction longitudinally of the shaft G as well as pivotally thereabout. A collar $F^3$ is arranged upon the opposite side of the journal bearing and is adjustably positioned by a set screw, while the rock arm F' is also adjustably secured by a set screw, thereby permitting the proper alinement of each of the shafts F and G.

The shafts E and F are preferably arranged on opposite sides of the axis of the casing C and in the same horizontal plane. Below the plane of these shafts, is the push rod D, which is actuated by a pedal lever Q fulcrumed upon a lug R integral with the casing C. This pedal lever extends upward and is arranged for convenient operation in relation to the footboard of the vehicle.

The construction above described forms a simple, effective and inexpensive means of supporting and actuating the various elements of the control mechanism.

What I claim as my invention is:

1. In a control mechanism for motor vehicles, the combination with the vehicle frame, of a rock shaft extending transversely thereof, a second rock shaft extending longitudinally of the frame, a journal bearing for said second shaft pivotally engaged by and supported from said first shaft, means upon said first shaft for holding said bearing from longitudinal movement thereon, a rock arm on said second rock shaft adjacent to said journal, and an actuating link for said rock arm movable in a direction substantially parallel to said first rock shaft.

2. In a control mechanism for motor vehicles, the combination with the frame, of a rock shaft extending transversely thereof, a tubular rock shaft sleeved thereon, a rock arm secured to said tubular rock shaft, a slidable rod extending longitudinally of said frame, a link connecting said slidable rod with said rock arm, a second rock shaft parallel to said slidable rod and extending transversely to said first-mentioned rock shaft, a hanger sleeved on said first shaft forming a journal bearing for said second rock shaft, a rock arm on said second rock shaft adjacent to said journal bearing, and an actuating member for said last mentioned rock arm movable in a direction substantially parallel to said first-mentioned rock shaft.

3. In a control mechanism for motor vehicles, two rock shafts extending in directions transverse to each other, a hanger having portions sleeved upon each of said shafts and held from longitudinal movement thereon, a rock arm on each rock shaft, and an actuating member for each rock arm movable in a direction longitudinally of the opposite shaft.

4. In a control mechanism for motor vehicles, the combination with a frame, of a transmission housing secured centrally of the frame, a rock shaft and a slidable rod extending from said housing longitudinally of said frame and substantially parallelly arranged, a transversely extending rock shaft, a bearing journaled upon each of said rock shafts and connecting the same together, adjustable means for positioning said bearings upon said shafts and holding the same from longitudinal movement, and actuating levers for each of said rock shafts and for said slidable rod.

5. In a control mechanism for motor vehicles, the combination with the frame including spaced side sills, of a rock shaft extending across the frame and journaled in bearings in said sills, a second rock shaft extending longitudinally of the frame, a member suspended from the first mentioned shaft having transverse bearing portions arranged in different planes and loosely sleeved on said shafts, adjustable collars on each of the shafts upon opposite sides of said member for positioning the latter in relation to the shafts, and an actuating link pivotally connected to one of the collars on the longitudinally extending shaft.

6. In a control mechanism for motor vehicles, the combination with the vehicle frame including spaced side sills, of a rock shaft extending across the frame and journaled in said sills, a second rock shaft extending longitudinally of the frame a journal bearing for said second shaft pivotally engaged by and supported from the first shaft, means upon said first shaft for holding said bearing from longitudinal movement, a rock arm on said second rock shaft, and an actuating link for said rock arm.

7. In a control mechanism for motor vehicles, the combination with the frame including spaced side sills, of a rock shaft extending across the frame and journaled in said side sills, a tubular rock shaft sleeved upon the transverse shaft, a rock arm secured to said tubular rock shaft, a slidable rod extending longitudinally of the frame, a link connecting said slidable rod with said rock arm, a second rock shaft extending transversely to the first mentioned rock shaft, a hanger sleeved on said first shaft forming a journal bearing for the second rock shaft, a rock arm on the second rock shaft, and an actuating member for said last mentioned rock arm.

In testimony whereof I affix my signature in presence of two witnesses.

EMIL A. NELSON.

Witnesses:
CHAS. D. HASTINGS,
T. F. DREWS.

---

Copies of this patent may be obtained for five cents each, by addressing the "Commissioner of Patents, Washington, D. C."